(12) United States Patent
Maeshima et al.

(10) Patent No.: US 6,987,967 B2
(45) Date of Patent: *Jan. 17, 2006

(54) COMMUNICATION APPARATUS AND COMMUNICATION METHOD

(75) Inventors: Yasunori Maeshima, Tokyo (JP); Shigeru Sugaya, Kanagawa (JP); Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/082,875

(22) Filed: Mar. 18, 2005

(65) Prior Publication Data

US 2005/0164697 A1 Jul. 28, 2005

Related U.S. Application Data

(63) Continuation of application No. 09/940,579, filed on Aug. 29, 2001, now Pat. No. 6,876,850.

(30) Foreign Application Priority Data

Aug. 30, 2000 (JP) ............................. 2000-261585
Nov. 27, 2000 (JP) ............................. 2000-359729

(51) Int. Cl.
*H04Q 7/20* (2006.01)

(52) U.S. Cl. .................. 455/422.1; 455/500; 455/507; 370/254

(58) Field of Classification Search ................ 455/500, 455/507, 420; 370/449, 457
See application file for complete search history.

(56) References Cited

U.S. PATENT DOCUMENTS

| | | | | |
|---|---|---|---|---|
| 5,953,328 A | * | 9/1999 | Kim et al. | 370/337 |
| 6,184,778 B1 | * | 2/2001 | Tsuji | 340/286.02 |
| 6,275,500 B1 | * | 8/2001 | Callaway et al. | 370/449 |
| 6,434,113 B1 | * | 8/2002 | Gubbi | 370/216 |
| 6,590,928 B1 | * | 7/2003 | Haartsen | 375/134 |
| 6,603,747 B2 | * | 8/2003 | Asai | 370/322 |
| 6,680,903 B1 | * | 1/2004 | Moriguchi et al. | 370/216 |
| 6,721,285 B1 | * | 4/2004 | Carro | 370/277 |

* cited by examiner

*Primary Examiner*—William Trost
*Assistant Examiner*—Brandon J. Miller
(74) *Attorney, Agent, or Firm*—Oblon, Spivak, McClelland, Maier & Neustadt, P.C.

(57) ABSTRACT

A communication apparatus which is in a wireless network is characterized by comprising a communication means transmitting information among the other communication devices, a means receiving priority order information representing stand-by times different in each communication device from the control station and setting communication devices as control station candidates in a memory, and a means performing communication control as a control station in the wireless network when the stand-by time elapses.

1 Claim, 13 Drawing Sheets

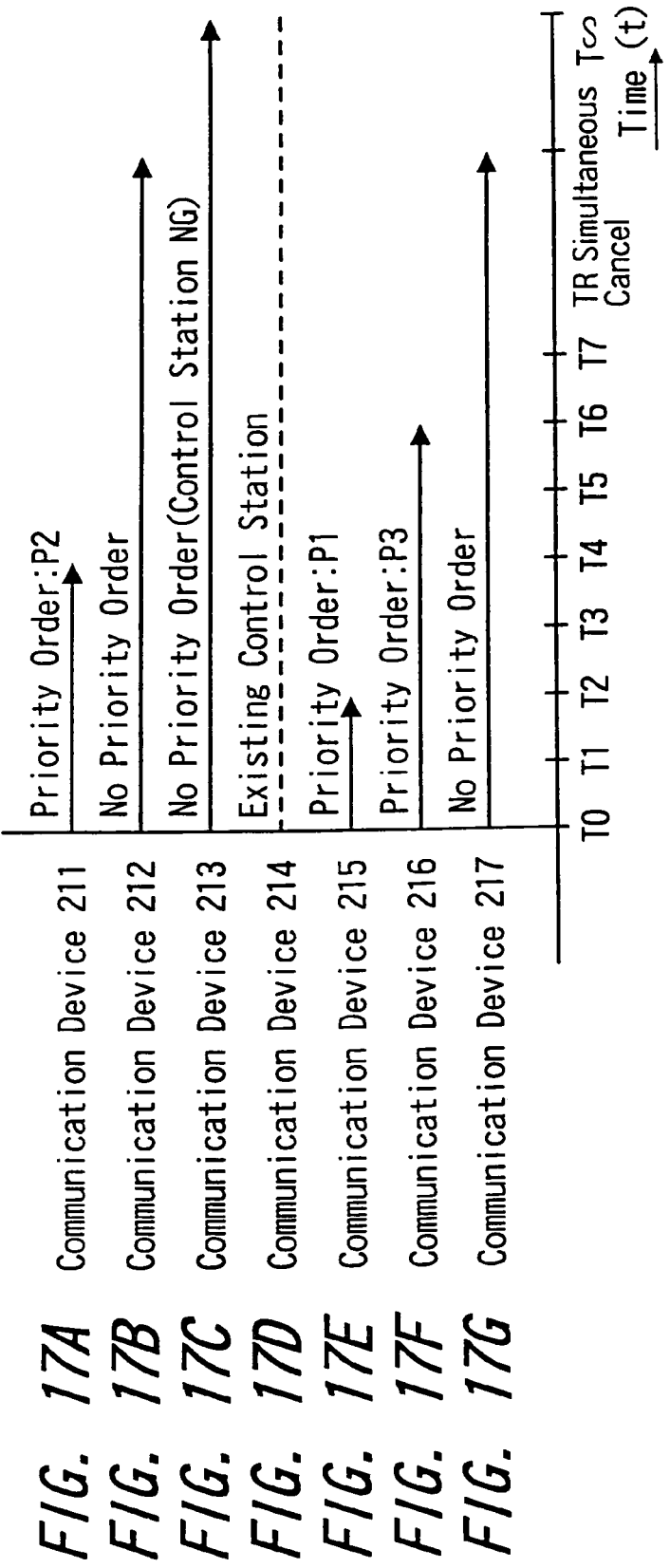

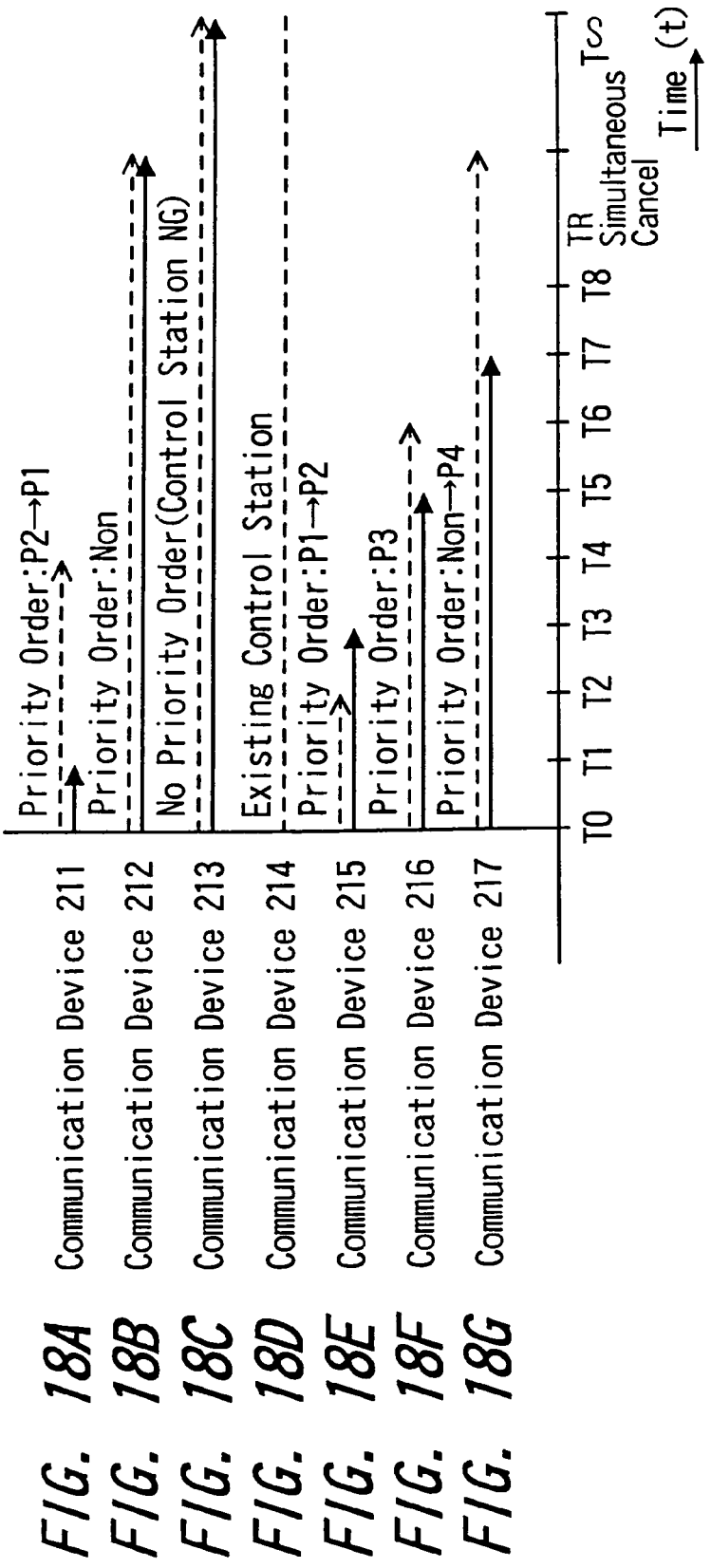

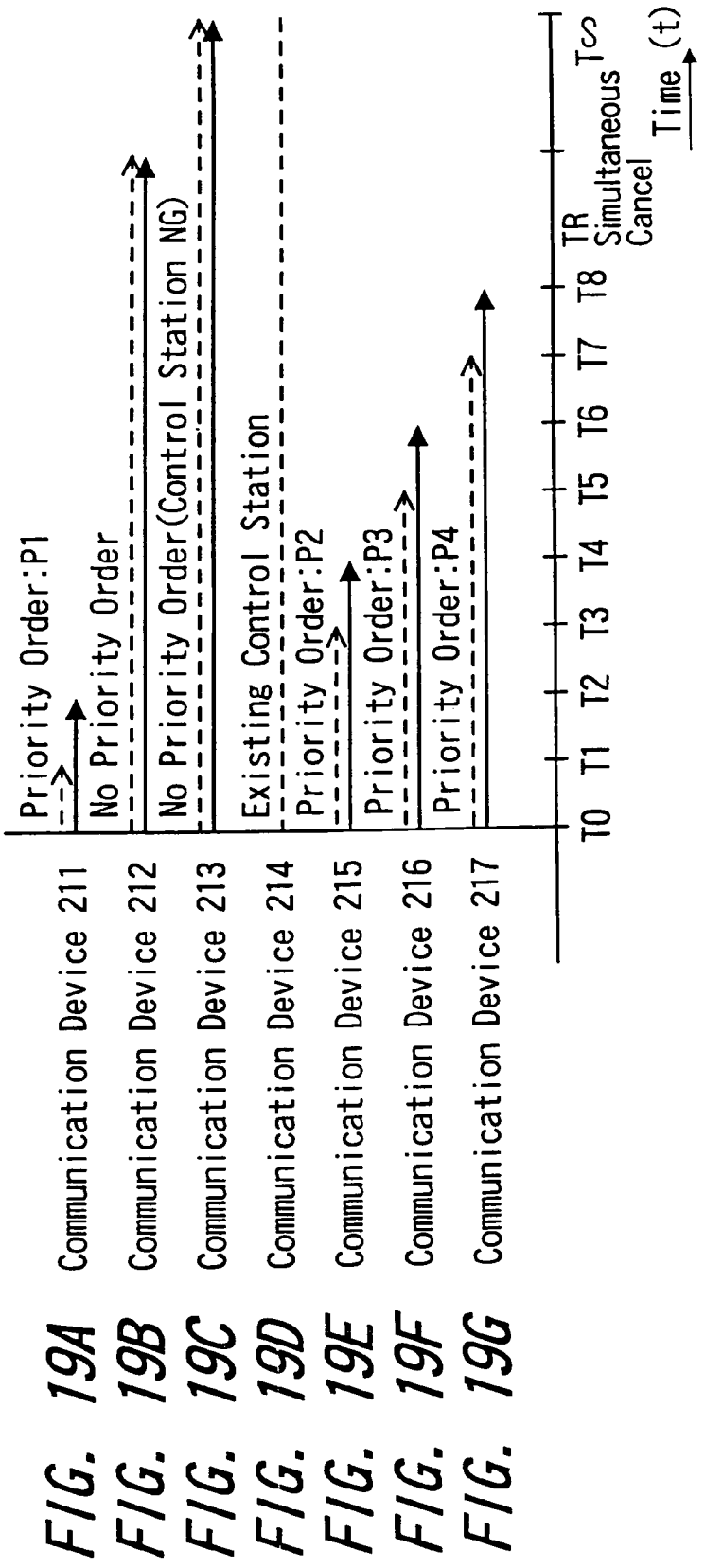

FIG. 20

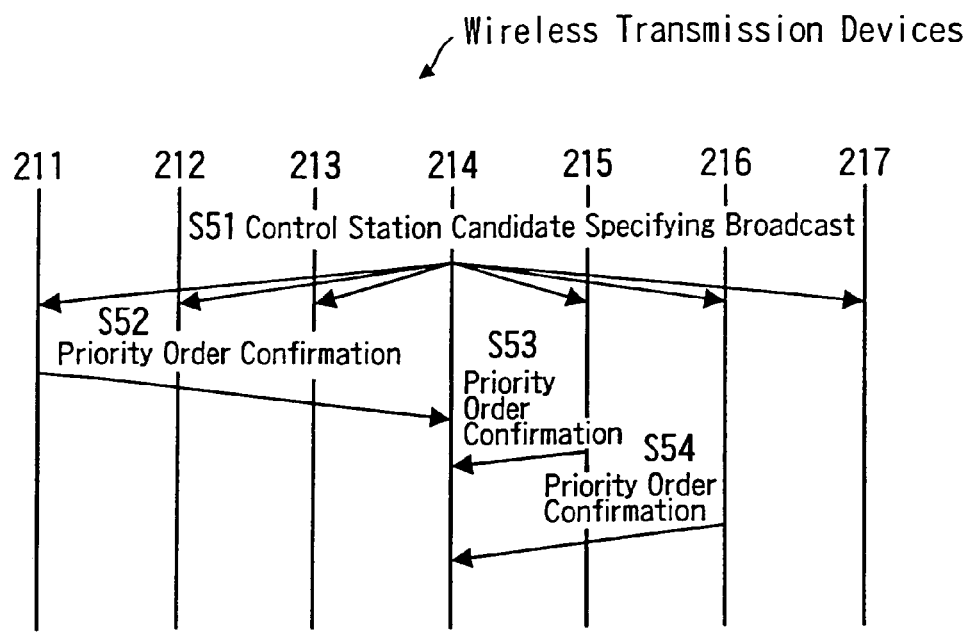

FIG. 21

| 241<br>Packet Type | 242<br>Transmission Source<br>Communicating Station ID | 243<br>Reception Destination<br>Communicating station ID |
|---|---|---|
| 244<br>Priority Order:P1 | 244-1<br>Stand-by Time | 244-2<br>Control Station Candidate<br>Communicating Station ID |
| 245<br>Priority Order:P2 | 245-1<br>Stand-by Time | 245-2<br>Control Station Candidate<br>Communicating Station ID |
| 246<br>Priority Order:P3 | 246-1<br>Stand-by Time | 246-2<br>Control Station Candidate<br>Communicating Station ID |
| 247 Reserve ||| 
| 248 CRC |||

FIG. 22

| 251 Packet Type | 252 Transmission Source Communicating Station ID | 253 Reception Destination Communicating station ID |
|---|---|---|
| 254 Specified Priority Order | 255 Stand-by Time | 256 Specified Communicating Station ID |
| 257 Reserve ||| 
| 258 CRC |||

COMMUNICATION APPARATUS AND COMMUNICATION METHOD

CROSS REFERENCE TO RELATED APPLICATION

This application is a continuation of application Ser. No. 09/940,579, filed Aug. 29, 2001 now U.S. Pat. No. 6,876,850, the entire contents being incorporated herein by reference.

BACKGROUND OF THE INVENTION

1. Field of the Invention

The present invention relates to network systems, communication apparatus, and communication control methods wherein various kinds of information is transmitted, for example, through radio signals, among a plurality of communication terminals.

2. Description of the Related Art

Conventionally, a network system, for example, in which wireless transmitters are incorporated in personal computers or audio-video devices so as to transmit information among these plural personal computers or audio-video devices is known. In such network system, employed generally is a method in which various types of transmission managements are performed under the control of one central control station, and a plurality of terminal stations are controlled. In this case, a communicating station operating as a control station is set so as to subordinate other communicating stations to the control station to form a network while employing a plurality of wireless communication devices.

In the case where a network is formed employing a plurality of wireless communication devices, a wireless communication control method and the like has been considered wherein a predetermined wireless communication device is specified as the control station of the network, and, for example, a periodic transmission frame cycle is set, or access control of an information transmission region is performed, based on the control of the control station.

In recent years, a wireless communication device has been developed wherein so called an adhoc wireless network can be constructed in which a specific wireless communication device is not determined as the control station from the beginning, and an arbitrary wireless communication device is set as the control station of the wireless network as the need arises so that information can be communicated without any access points. For example, in Japanese Patent Application Laid-Open No. 2000-082989, disclosed is a wireless communication method where so called an adhoc wireless network is constructed in which information can be communicated without any access points while a control station mode and a terminal station mode are switched alternately.

However, in this conventional network system, it is supposed that some inconvenience occurs in a central control station, and the function of the central control station is damaged. In this case, in the conventional network system, a necessity occurs wherein the operating condition of the network is once reset, and another terminal station becomes the central control station so that a wireless network is newly constructed once again. Thus, in the conventional network system, in order to perform this reset (reconstruction of the new wireless network), data transmitted on the network operating so far is temporarily suspended, taking an enormous time period until the network is operated once again.

In order to solve the problem, in Japanese Patent Application Laid-Open No. 2000-151618, the present applicant has proposed a system in which another terminal station in the network is operated as a central control station automatically when some inconvenience occurs in the central control station (master control station) in the network. In this proposed system, the central control station needs to specify in advance a terminal station which would be the central control station when an inconvenience occurs in the master control station as a slave control station. However, for example, in a case where a common power supply is employed for the master control station and the slave control station, when only one slave control station is prepared in the network, and when an inconvenience occurs in both stations at the same time, such problem cannot be dealt with.

SUMMARY OF THE INVENTION

The present invention was developed considering such circumstances, and it is an object of the present invention to provide communication devices and communication methods by which stable information transmissions can be performed without stopping the operating condition even when some inconvenience occurs in a central control station.

A communication apparatus, according to the present invention, which employs a plurality of communication devices to construct a wireless network to be a control station transmitting management information in the wireless network, is characterized by comprising a communication means transmitting information among the plurality of communication devices, a determining means determining as to whether, when the control station disappears from the wireless network, in order that any one of other communication devices is newly operated as a control station, the other communication devices have a control function as a control station candidate or not, a set means setting priority order for each of control station candidates when there exist a plurality of communication devices to be the control station candidates, and a notification means notifying the wireless network of priority order information of the control station candidates.

That is, for the time when the master control station becomes incapable of communication, priority order is set in advance for a plurality of slave control station candidates in the wireless network.

A communication apparatus, according to the present invention, which is in a wireless network, is characterized by comprising a communication means transmitting information among the other communication devices, a means receiving priority order information representing stand-by times different in each communication device from the control station and setting communication devices as control station candidates in a memory, and a means performing communication control as a control station in the wireless network when the stand-by time elapses.

That is, when the master control station becomes incapable of communication, it is set that a plurality of slave control stations perform communication control as control stations sequentially based on preset priority order.

BRIEF DESCRIPTION OF THE DRAWINGS

FIG. 17 is a chart illustrating network stand-by time for each communicating station according to one embodiment of the present invention, and FIG. 17A corresponds to a communication device 211, FIG. 17B a communication device 212, FIG. 17C a communication device 213, FIG. 17D a communication device 214, FIG. 17E a communication device 215, FIG. 17F a communication device 216, and FIG. 17G a communication device 217;

FIG. 18 is a chart illustrating transition states of changes in network stand-by time for each communicating station according to one embodiment of the present invention, and FIG. 18A corresponds to the communication device 211, FIG. 18B the communication device 212, FIG. 18C the communication device 213, FIG. 18D the communication device 214, FIG. 18E the communication device 215, FIG. 18F the communication device 216, and FIG. 18G the communication device 217;

FIG. 19 is a chart illustrating confirmation states of changes in network stand-by time for each communicating station according to one embodiment of the present invention, and FIG. 19A corresponds to the communication device 211, FIG. 19B the communication device 212, FIG. 19C the communication device 213, FIG. 19D the communication device 214, FIG. 19E the communication device 215, FIG. 19F the communication device 216, and FIG. 19G the communication device 217;

FIG. 20 is a chart illustrating a transmission sequence example of control station candidate information according to one embodiment of the present invention;

FIG. 21 is a view illustrating an example of the structure of a control station candidate specifying packet according to one embodiment of the present invention; and FIG. 22 is a view illustrating an example of the structure of a priority order confirming packet according to one embodiment of the present invention.

DETAILED DESCRIPTION OF THE PREFERRED EMBODIMENTS

Network systems to which the present invention is applied are explained as embodiments of the present invention below referring to drawings.

1) Embodiment 1

Figure 1:
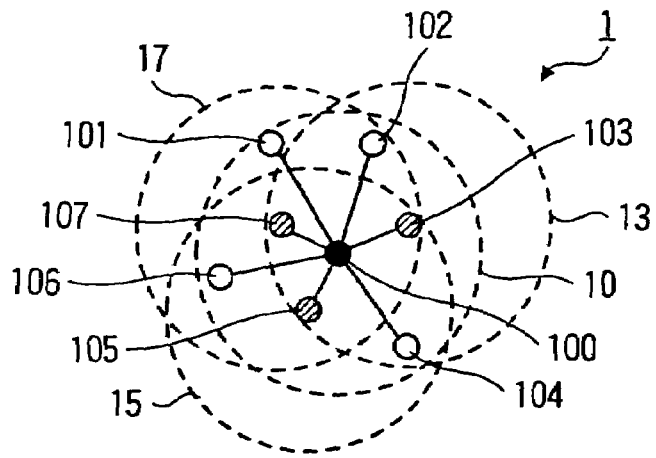
FIG. 1 is an explanatory view illustrating an example of a network system structure according to one embodiment of the present invention.

A network system 1 is, for example, composed of eight communication terminals 100, 101, 102, 103, 104, 105, 106, 107 as shown in FIG. 1. The respective communication terminals 100 to 107 perform wireless communications of signals obtained by modulating, for example, carrier waves of 5 GHz, and mutually transmit information. Here, the communication terminal 100 becomes a central control station (master control station) and directly controls communications of all peripheral stations 101 to 107 in a radio wave attainable region 10 of the communication terminal 100. When the communication terminal 100 cannot perform operations as the central control station, the communication terminals 103, 105, 107 are here prepared as communication terminals (slave control stations) which can be the central control stations. Here, a radio wave attainable region 13 of the communication terminal 103, a radio wave attainable region 15 of the communication terminal 105, and a radio wave attainable region 17 of the communication terminal 107 do not cover all communication terminals in the network system 1. However, transmitting with a terminal outside of a radio wave attainable region is possible through a relay transmission as described later on.

Figure 2:
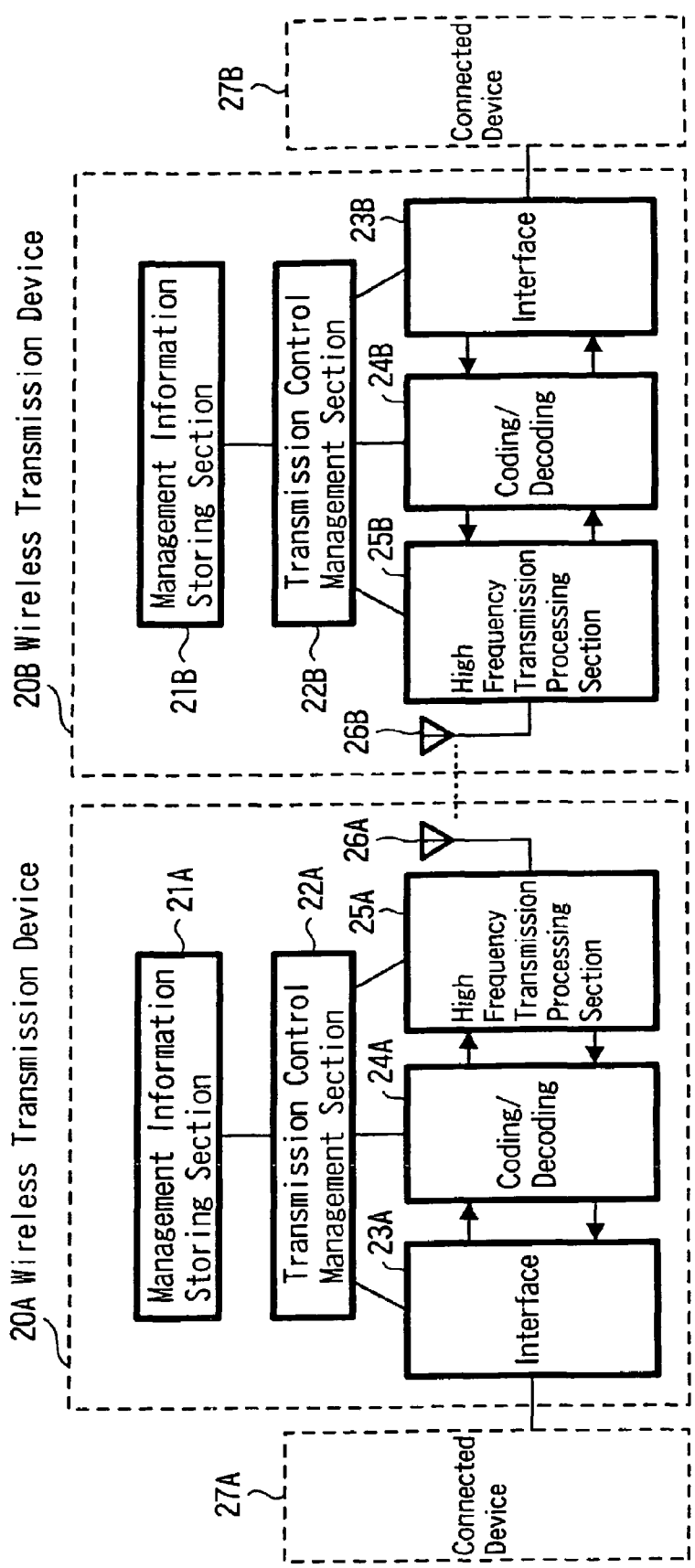
FIG. 2 is a block diagram illustrating an example of a communication terminal structure according to one embodiment of the present invention.

FIG. 2 is a diagram illustrating the respective communication terminals 100 to 107 and a configuration connected to the communication terminals. Here, two wireless communication devices 20A, 20B are shown. The respective wireless communication devices 20A, 20B are provided with transmission control management sections 22A, 22B to which management information storing sections 21A, 21B are connected, and wireless transmission processing is performed under the control of the transmission control management sections 22A, 22B. The data transmission processing between devices 27A, 27B connected to the respective wireless communication devices 20A, 20B is performed in interface sections 23A, 23B. High frequency transmission processing sections 25A, 25B are connected to the interface sections 23A, 23B via coding/decoding sections 24A, 24B, and sending and receiving of radio signals are performed through antennas 26A, 26B connected to the high frequency transmission processing sections 25A, 25B. Various information devices such as a personal computer unit, an audio-video device, or the like, are employed as the devices 27A, 27B connected to the wireless communication devices 20A, 20B.

The management information storing sections 21A, 21B store network management information, operating program, and the like, such as information necessary as a master control station and a slave control station (the details are set forth later on). These management information storing sections 21A, 21B also store and hold data related to the priority order that a slave control station described later on needs.

The transmission control management sections 22A, 22B govern and control the interface sections 23A, 23B, the coding/decoding sections 24A, 24B, and the high frequency transmission processing sections 25A, 25B based on the information stored in the management information storing sections 21A, 21B. The interface sections 23A, 23B send/receive data to/from the devices 27A, 27B connected to the wireless communication devices such as a personal computer unit and an audio-video device. The connections between the interface sections 23A, 23B and the devices 27A, 27B are bridges in conformity to a bus line standardized, for example, as IEEE (The Institute of Electrical and Electronics Engineers) 1394 format.

The coding/decoding sections 24A, 24B perform coding of data transmitted via the network and decoding of data received via the network. The high frequency transmission processing sections 25A, 25B perform modulation/demodulation processing or the like of data transmitted via the antennas 26A, 26B.

The wireless communication devices 20A, 20B are not limited to ones with the structures as shown in FIG. 2, and any other structures can be employed as far as they can realize the present invention. Although only two wireless transmission devices are shown in FIG. 2, for example, in the case of the network structure shown in FIG. 1, the network system 1 is formed preparing eight wireless transmission devices. However, it is not necessary that all the wireless transmission devices in the network system 1 are connected to devices (the devices 27A, 27B in FIG. 2) such as a personal computer unit or an audio-video device. The transmission control management sections 22A, 22B do not have to make all the wireless transmission devices in the network system 1 perform control operations necessary as a master control station or a slave control station, and for example, a means or a program for performing control operations are not necessary to be prepared for some number of wireless transmission devices in the network system 1. In the explanation below, all wireless transmission devices in the network system 1 can be a master control station or a slave control station.

Figure 3:
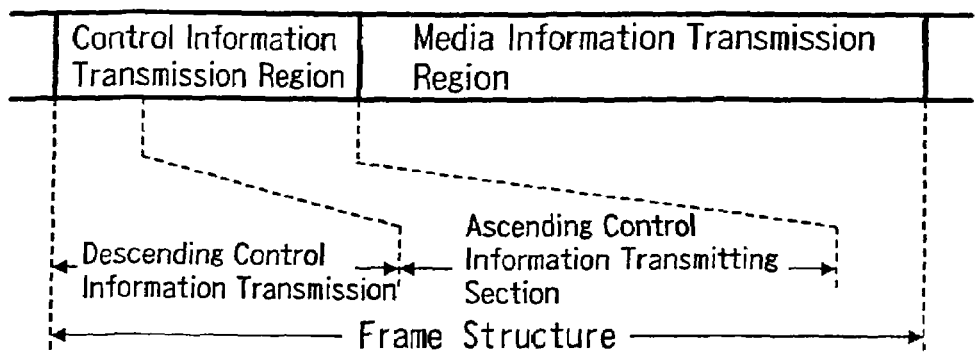
FIG. 3 is an explanatory view illustrating an example of a frame structure according to one embodiment of the present invention.

An example of a frame structure of data transmitted among the respective communication terminals 100 to 107 is shown in FIG. 3.

The transmission among the respective communication terminals 100 to 107 is performed in setting a frame period here. One frame is, for example, set to 4 ms, and a media information transmission region and a control information transmission region are provided in one frame so that this frame structure is repeated. Real data exchanged among the respective communication terminals 100 to 107 is transmitted in the media information transmission region. The control information transmission region is provided with a section in which descending control information that a master station transmits control information to the respective communication terminals is transmitted and a section in which all communication terminals on the network transmit ascending control information. Another frame structure may be set wherein a fixed time slot divided for each station is prepared between the ascending control information transmitting sections, and the ascending control information is sent/received to/from all stations on the network so that mutual connection condition is confirmed through information of connection link relationship among respective stations.

In the network system 1 of such structure, a master control station functioning as a central control station performing management of the information transmission among the respective communication terminals is set. In the network system 1 shown in FIG. 1, for example, the communication terminal 100 is set as the master control station (hereafter, this communication terminal 100 may also be called the master control station 100). This master control station 100 transmits management information in the section in which the descending control information described above is transmitted and controls transmission of data by the respective communication terminals. The peripheral communication terminals 101 to 107 exist in the radio wave attainable region 10 of the master control station 100. That is, the master control station 100 can directly communicate with the peripheral communication terminals 101 to 107.

In the network system 1 having such structure, when an inconvenience occurs in the master control station 100 and the master control station 100 does not carry out the function as the central control station, a plurality of slave control stations carrying out the function as the central control station are set as a substitute for the master control station 100. In the network system 100 shown in FIG. 1, for example, three communication terminals 103, 105, 107 are set as the slave control stations (hereafter, these communication terminals 103, 105, 107 may also be called the slave control stations). In this case, priority order is set for the case where the communication terminals 103, 105, 107 carry out the function as the central control stations among the three communication terminals 103, 105, 107. This priority order is determined by the master control station 100 instructing one terminal to be a slave control station, and the order of the stations are stored in the respective slave control stations 103, 105, 107 themselves.

These slave control station 103, 105, 107 transmit the management information during the section in which the descending control information described above is transmitted and control transmission of data by the respective communication terminals when the function as the central control station is not carried out since an inconvenience occurs in the master control station 100. However, processing to transmit the management information in accordance with the priority order described above is supposed to be performed, and when a state where transmission control is correctly performed by any one of the slave control stations occurs, other slave control stations do not carry out the transmission control and wait.

Here, in the network system 1, the master control station 100 specifies three communication terminals as slave control stations in the order of most excellent communication terminals in an information transmission condition with other peripheral stations among the peripheral communication terminals 101 to 107 with which the master control station 100 can directly communicate. The communication terminal excellent in the information transmission condition herein is determined, for example, from the number of communication terminals capable of direct communication in the network and communication quality with the respective communication terminals. Specifically, for example, in the order from a communication terminal with which the number of communication terminals capable of direct communication in the network is the largest, one is set as a slave control station with a high priority order, and when the number of communication terminals capable of direct communication in the network is the same, a communication terminal for which the communication quality with other communication terminals at the time is judged as being excellent is selected as a slave control station with a high priority order. The communication quality herein is determined from, for example, the electric power of a received signal, error rate, or the like.

For a determination as to whether there is a connection with a peripheral station, which is necessary in making the above decisions, for example, techniques described in Japanese Patent Application No. Hei 10-47416 (Counterpart application in U.S. Ser. No. 09/252,807 and Japanese Patent Application No. Hei 10-258855 (Counterpart application in U.S. Ser. No. 09/392,739 that the present applicant has proposed may be employed wherein respective stations on a network mutually send/receive ascending control information in a fixed time slot to grasp a station existing around a station itself.

Figure 4:
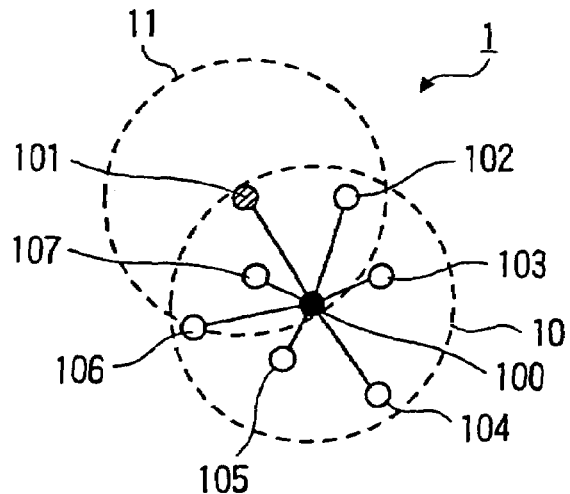
FIG. 4 is an explanatory view illustrating a communicable region of one communication terminal (terminal 101) in a network system according to one embodiment of the present invention.

Here, decision processing for selecting a slave control station in the network system 1 of the present example is explained. When a case where the communication terminal 101 is set as the central control station is supposed, the communication terminals 100, 102, 106, 107 exist in a radio wave attainable region 11, and the communication terminal 101 can communicate with these four stations as shown in FIG. 4.

Figure 5:
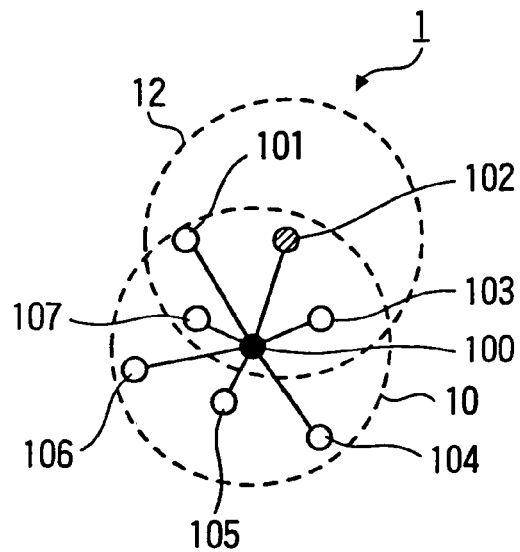
FIG. 5 is an explanatory view illustrating a communicable region of one communication terminal (terminal 102) in a network system according to one embodiment of the present invention.

The communication terminals 100, 101, 103, 107 exist in a radio wave attainable region 12, and the communication terminal 102 can communicate with these four stations as shown in FIG. 5.

Figure 6:
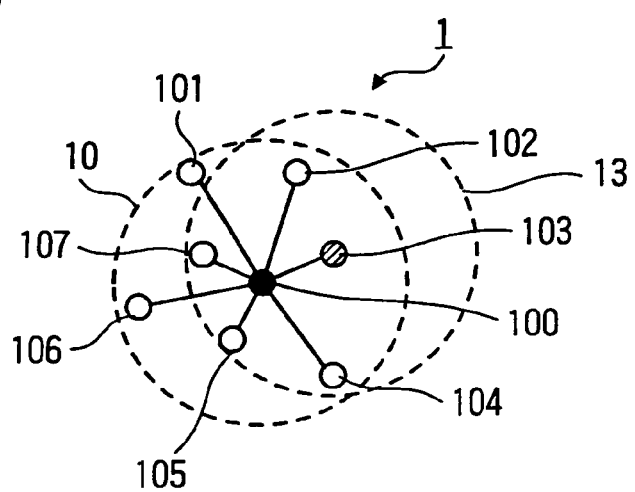
FIG. 6 is an explanatory view illustrating a communicable region of one communication terminal (terminal 103) in a network system according to one embodiment of the present invention.

The communication terminals 100, 102, 104, 105, 107 exist in a radio wave attainable region 13, and the communication terminal 103 can communicate with these five stations as shown in FIG. 6.

Figure 7:
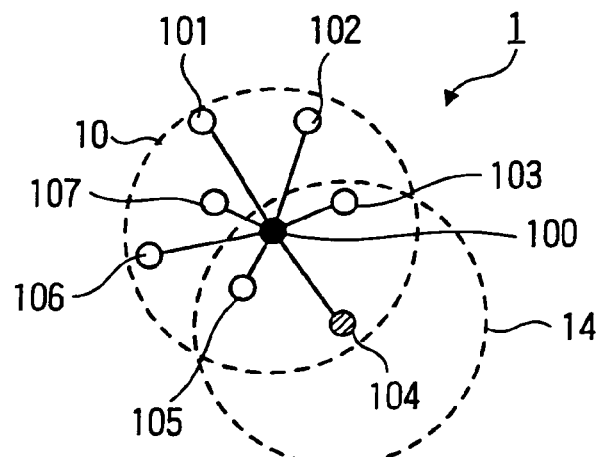
FIG. 7 is an explanatory view illustrating a communicable region of one communication terminal (terminal 104) in a network system according to one embodiment of the present invention.

The communication terminals 100, 103, 105 exist in a radio wave attainable region 14, and the communication terminal 104 can communicate with these three stations as shown in FIG. 7.

Figure 8:
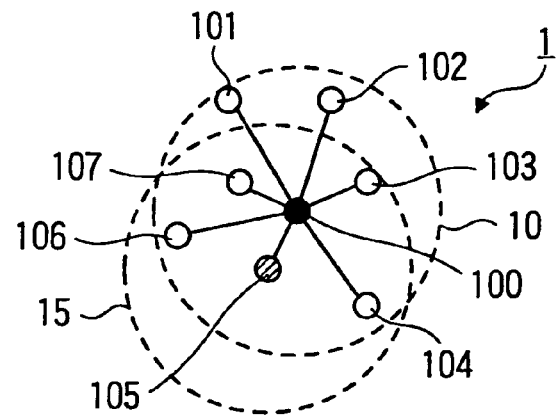
FIG. 8 is an explanatory view illustrating a communicable region of one communication terminal (terminal 105) in a network system according to one embodiment of the present invention.

The communication terminals 100, 103, 104, 106, 107 exist in a radio wave attainable region 15, and the communication terminal 105 can communicate with these five stations as shown in FIG. 8.

Figure 9:
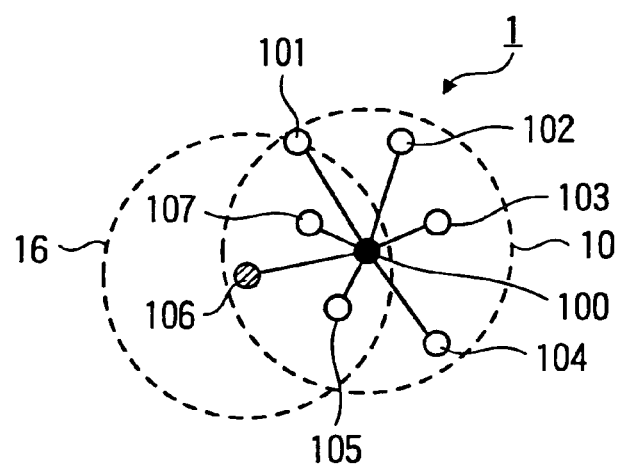
FIG. 9 is an explanatory view illustrating a communicable region of one communication terminal (terminal 106) in a network system according to one embodiment of the present invention.

The communication terminals 100, 101, 105, 107 exist in a radio wave attainable region 16, and the communication terminal 106 can communicate with these four stations as shown in FIG. 9.

Figure 10:
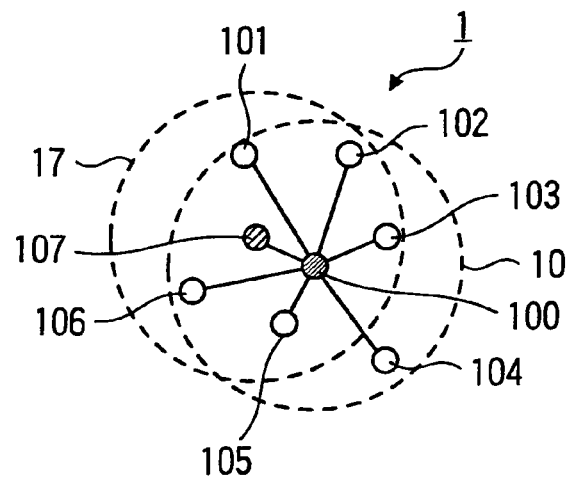
FIG. 10 is an explanatory view illustrating a communicable region of one communication terminal (terminal 107) in a network system according to one embodiment of the present invention.

The communication terminals 100, 101, 102, 103, 105, 106 exist in a radio wave attainable region, and the communication terminal 107 can communicate with these six stations as shown in FIG. 10.

As a result, in the network system 1, other than the central control station 100, since the communication terminal 107 can connect with the largest number of communication terminals (can connect with six stations), the communication terminal 107 is specified as a slave control station whose priority order is the highest.

Since the number of communication terminals capable of connection regarding the communication terminal 103 and the communication terminal 105 is large (communication with five stations is possible) next to that of the communication terminal 107, these two communication terminals 103, 105 are also specified as the slave control stations. However, since the number of stations capable of connection is the same in the two communication terminals 103, 105, the priority order of a terminal in which it is determined that the communication quality between each communication terminal 103, 105 and other communication terminals is excellent is set to a higher order. Here, while it is supposed that it is determined that the communication quality with peripheral stations regarding the communication terminal 105 is more excellent than that regarding the communication terminal 103, the communication terminal 105 is specified as second slave control station in the priority order, and the communication terminal 103 is specified as third slave control station in the priority order.

The decision regarding the communication quality for determining the order between the slave control station 103 and the slave control station 105 may be made from other factors. For example, either station in the two communication terminals 103, 105 which can directly communicate excellently with the master control station 100 (that is, a station that is supposed to be closer to the master control station) may be set to a higher order in the priority order. Also, in the case where the number of stations capable of direct connection is the same, a communication control station with a newer address may be simply specified as a slave control with a higher priority order without determining the communication quality as described above.

When the master control station 100 selects three slave control stations 103, 105, 107 as described above, the master control station 100 informs the entire network that the communication terminals 103, 105, 107 are specified as slave control stations. This notification may be made through a broadcast transmission by descending control information. In order to confirm the condition, confirmation information may be transmitted by ascending control information. At this notification time, information regarding the priority order of the three slave control stations 103, 105, 107 may also be notified.

In the notified three slave control stations 103, 105, 107, based on the priority order of a station itself specified at the time, a stand-by time of the time the master control station comes to a state where communication is not possible is registered. Here, the stand-by time for the communication terminal 107 that is first in the priority order is set to 1 second, the stand-by time for the communication terminal 105 that is second in the priority order is set to 2 seconds, and the stand-by time for the communication terminal 103 that is third in the priority order is set to 3 seconds. In the case where there are four or more slave control stations, each one second of stand-by time may be added further each time the order is lowered.

Figure 11:
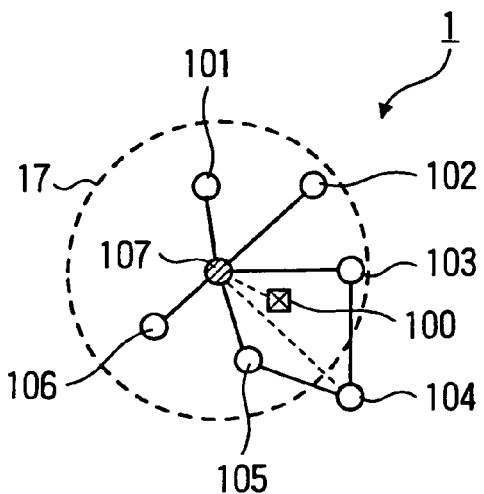
FIG. 11 is an explanatory view illustrating a communicable region of one communication terminal (terminal 107) in a network system according to one embodiment of the present invention.

FIG. 11 illustrates a communication state in the network of the time the communication terminal 107 that is a slave control station becomes the central control station when the master control station 100 becomes incapable of communication. At this time, since the descending control information transmitted from the slave control station 107 does not directly reach the communication terminal 104, another communication terminal 103 or 105 needs to relay and transmit it. The transmission of ascending control information and/or real data is also needed to be relayed similarly.

Figure 12:
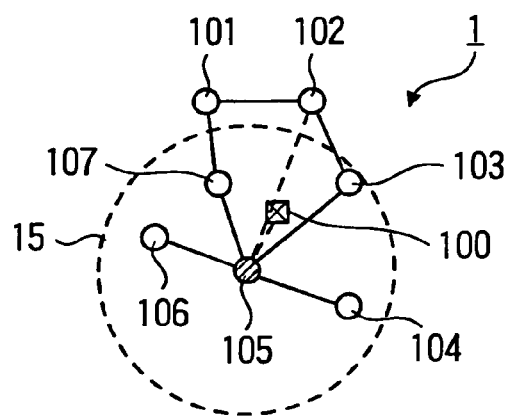
FIG. 12 is an explanatory view illustrating a communicable region of one communication terminal (terminal 105) in a network system according to one embodiment of the present invention.

FIG. 12 illustrates a communication state in the network of the time the communication terminal 105 that is a slave control station becomes the central control station when the master control station 100 becomes incapable of communication. At this time, since the descending control information transmitted from the slave control station 105 does not directly reach the communication terminals 101, 102, other communication terminals 103, 107 need to relay and transmit it. The transmission of ascending control information and/or real data is also needed to be relayed similarly.

Figure 13:
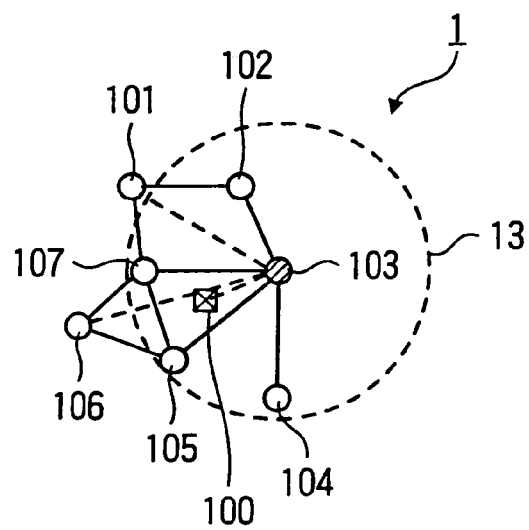
FIG. 13 is an explanatory view illustrating a communicable region of one communication terminal (terminal 103) in a network system according to one embodiment of the present invention.

FIG. 13 illustrates a communication state in the network of the time the communication terminal 103 that is a slave control station becomes the central control station when the master control station 100 becomes incapable of communication. At this time, since the descending control information transmitted from the slave control station 103 does not directly reach the communication terminals 101, 106, other communication terminals 102 and 105 or 107 need to relay and transmit it. The transmission of ascending control information and/or real data is also needed to be relayed similarly.

With respect to processing incorporating a communication terminal existing outside of a radio wave attainable region of a control station into a network by relay and transmission, for example, it is possible to employing a technique shown in Japanese Patent Application No. Hei 10-258855 submitted by the present applicant and incorporate such terminal into the network as a hidden terminal station.

Figure 14:
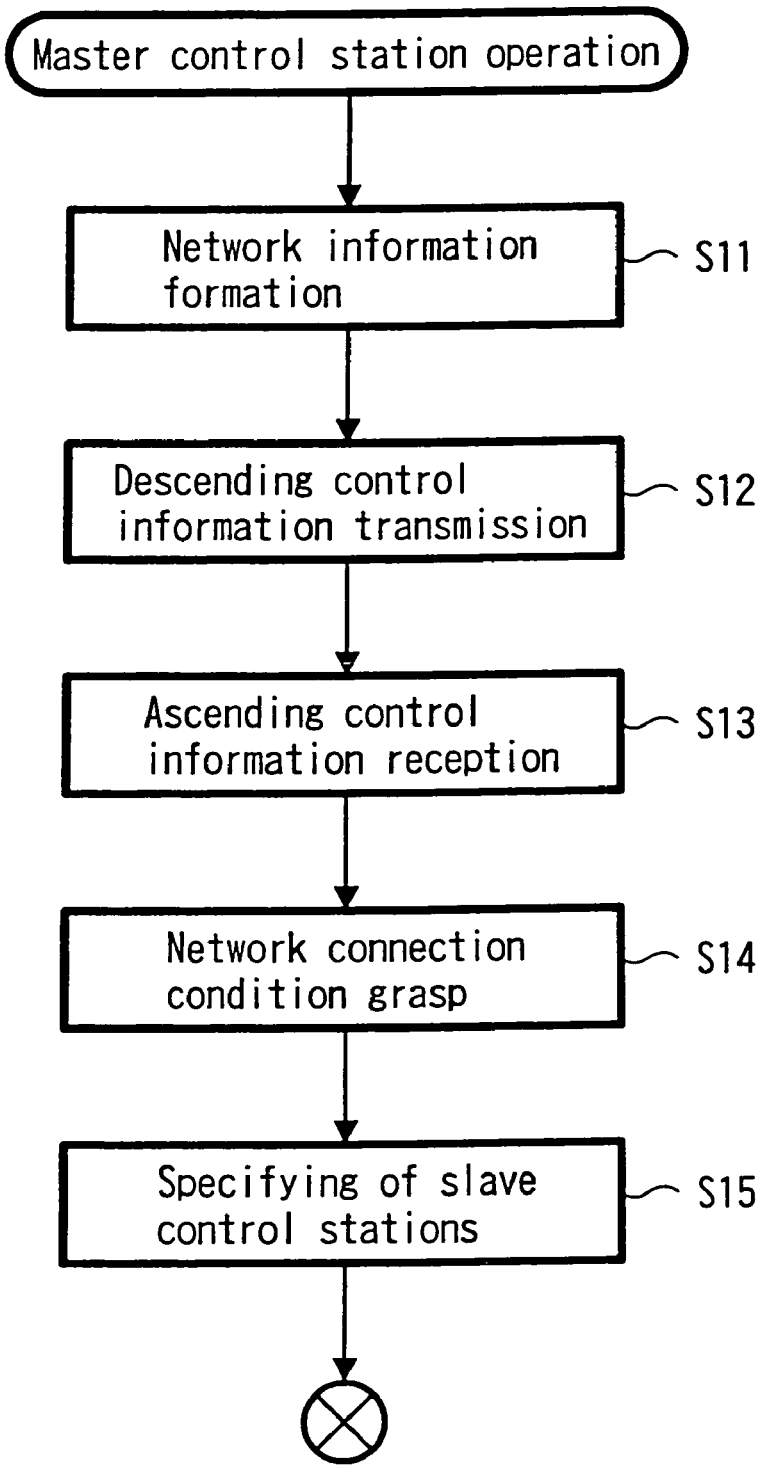
FIG. 14 is a flow chart explaining operations of a communication terminal as a master control station according to one embodiment of the present invention.

Next, operations of the master control station 100 are explained employing a flow chart shown in FIG. 14.

The master control station 100 first forms network common information from a collection result of connection information of the network and information of a specified slave control station at step S11. Then, at step S12, a broadcast transmission is performed on the network in the descending control information communication section.

Thereafter, the master control station 100 receives the ascending information sent from the peripheral communication terminals 101 to 107 at step S13. Connection condition of the network is then grasped at step S14.

The master control station 100 specifies and registers as slave control stations three communication terminals in the order from a station in which the number of connection links is the largest among the peripheral communication terminals 101 to 107 at step S15.

Figure 15:
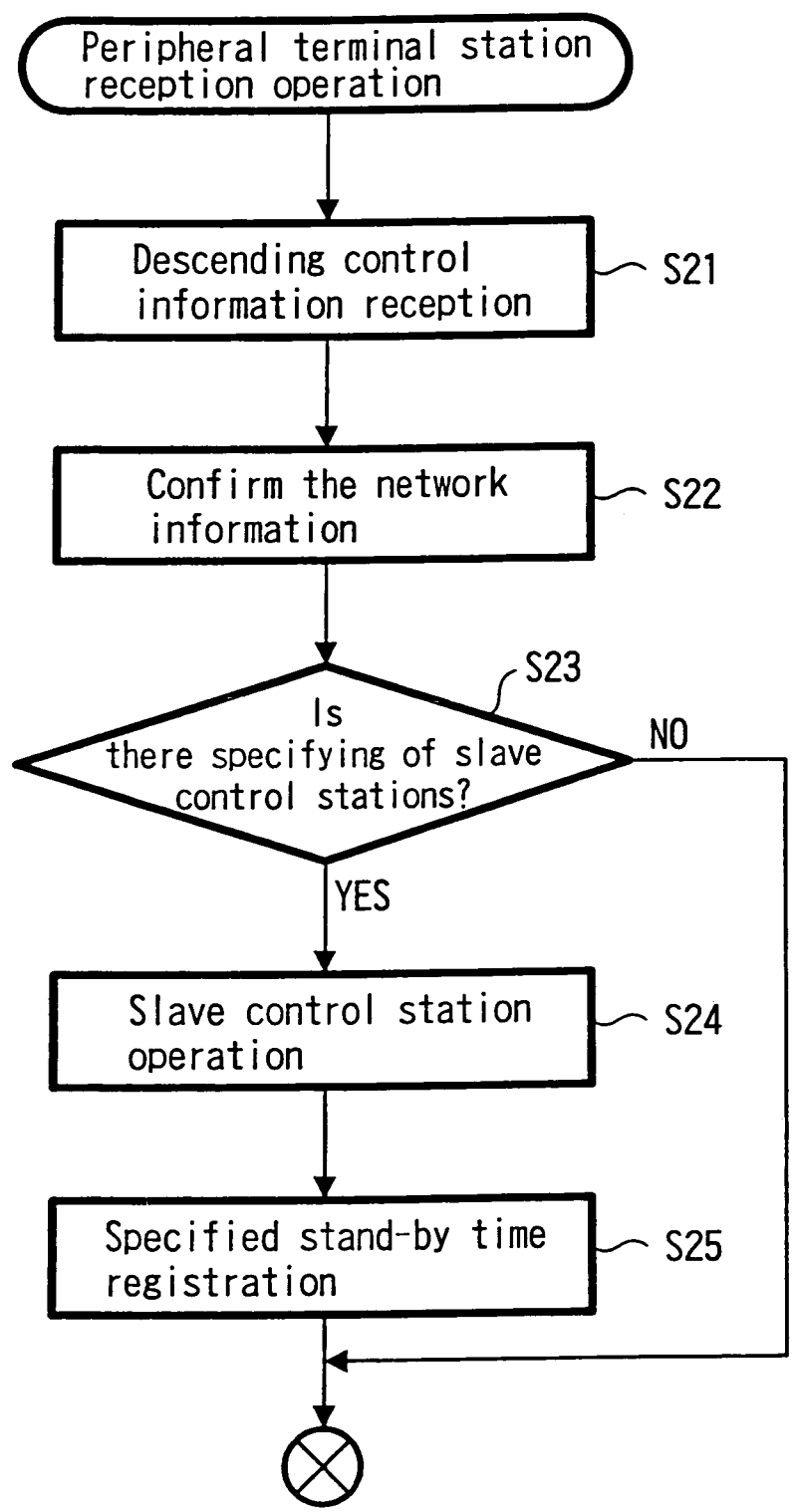
FIG. 15 is a flow chart explaining operations of the time when a communication terminal is set as a slave control station according to one embodiment of the present invention.

Next, operations in the communication terminals 101 to 107 other than the master control station 100 are explained employing a flow chart shown in FIG. 15.

The communication terminals 101 to 107 receive the descending information sent from the central control station (the master control station 100) at step S21. Confirmation operation of network information of the descending control information is then performed at step S22.

Here, as a result of analysis of the information, when specifying as slave control stations is performed by the master control station at step S23, operation to register as slave control stations is performed proceeding to step S24. At this time, at step S25, from a specified priority order, the stand-by time until the time of performing control operation as a central control station is registered. This registration is performed by storing it, for example, in the management information storing sections 21A, 21B of the wireless transmission devices 20A, 20B shown in FIG. 2 under the control of the transmission control management sections 22A, 22B. When the registration as a slave control station is performed, the confirmation information may be sent to the master control station (central control station), employing the ascending control information and the like.

When it is determined that the number of communication terminals with which that slave control station can directly communicate is larger than that of the master control station from network connection condition determined at the time of specifying a slave control station, a change request of a control station may be sent to the master control station so that the slave control station becomes the central control station.

Figure 16:
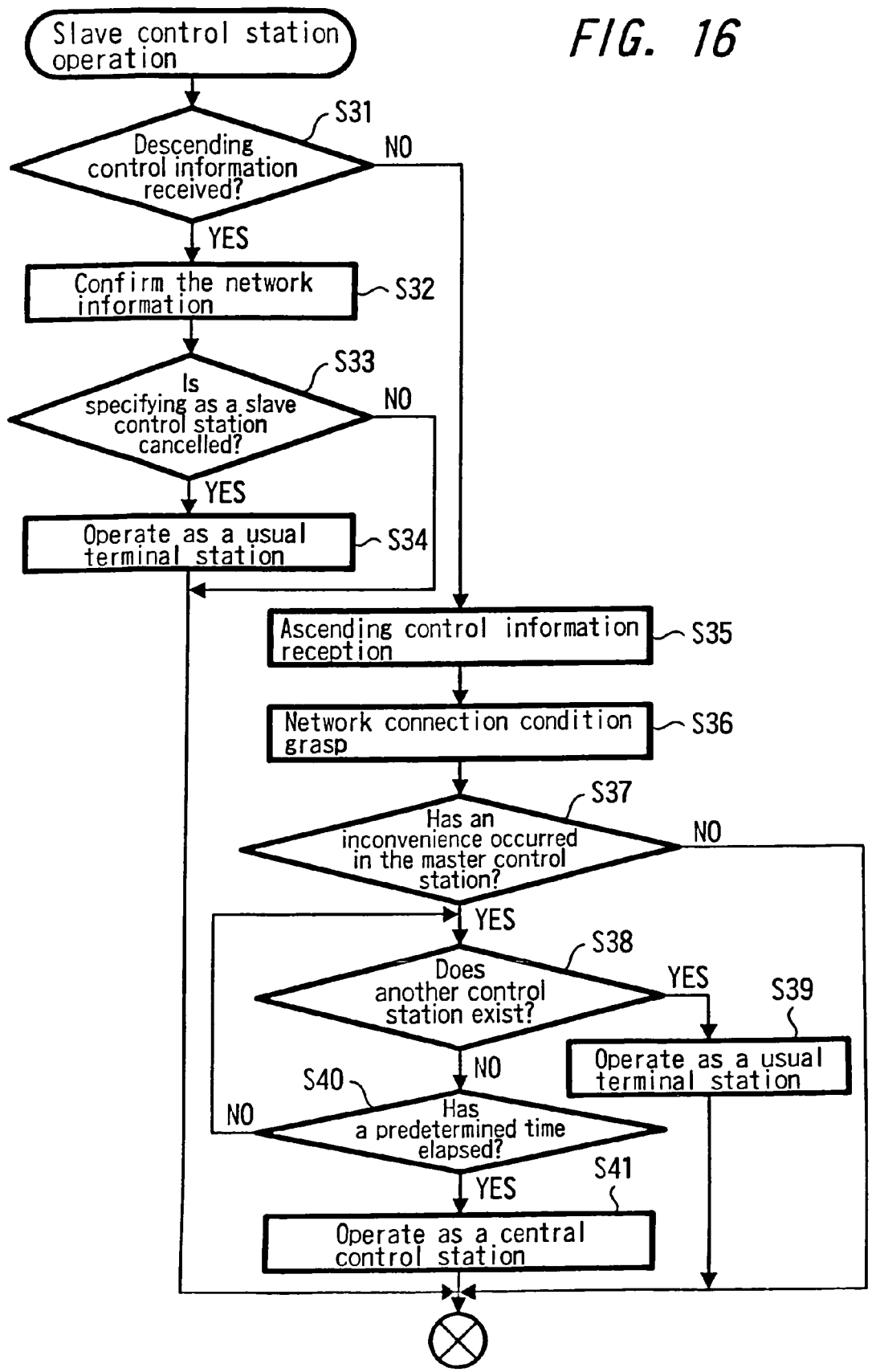
FIG. 16 is a flow chart explaining operations of a communication terminal as a slave control station according to one embodiment of the present invention.

Next, operations in the communication terminals (slave control stations 103, 105, 107) registered as slave control stations are explained employing a flow chart shown in FIG. 16.

The communication terminals as the slave control stations first try to receive the descending control information sent from the central control station (the master control station 100) at step S31.

When the descending control signal can be received at step S31, network information is confirmed with peripheral communication terminals at step S32. At step S33, it is determined whether or not specifying as a slave control station is cancelled from the master control station, and when the specifying as a slave control station is cancelled, the specifying as a slave control stations is cancelled so that a station performs an operation as a usual peripheral terminal station at step S34. When the specifying is not cancelled, an operation as a slave control station is performed as it is.

When the descending control information cannot be received at step S31, the ascending control information is received at step S35, and connection condition of the network is grasped at step S36. Then, at step S37, it is determined whether or not an inconvenience occurs in the master control station. With respect to the determination as to whether or not an inconvenience occurs in the master control station herein, for example, when the descending management information periodically transmitted from the master control station cannot be received, it is determined that an inconvenience is occurring in the master control station. However, since it can also be supposed that the descending management information cannot be received from about one time to several times for some reason even when the master control station operates correctly, it is preferred that it is determined that an inconvenience is occurring in the master control station when the descending management information cannot be received for some time continuously. Further, when the master control station cannot be recognized in all other peripheral terminal stations from the connection condition of the network grasped at step S36 (that is, the signal from the master control station cannot be received), it may be determined that an inconvenience is occurring in the master control station.

When it is determined that an inconvenience is occurring in the master control station, at step S38, it is determined whether or not another station which can operate as the control station is generated so that the descending management information can be received. Here, when the descending management information comes to be received, the station does not perform the operation as the central control station (that is, does not perform management of information transmission by sending of the descending management information) to perform the operation as a peripheral terminal station at step S39.

When the descending management information cannot be received at step S38, at step S40, it is determined whether or not the stand-by time registered in the station has elapsed since an inconvenience occurs in the master control station. For example, in the slave control station 107 that is first in the priority order, it is determined whether 1 second has elapsed since an inconvenience occurs in the master control station. In the slave control station 105 that is second in the priority order, it is determined whether 2 seconds has elapsed since the inconvenience occurs in the master control station. In the slave control station 103 that is third in the priority order, it is determined whether 3 seconds has elapsed since the inconvenience occurs in the master control station. When it is determined that the stand-by time registered in the station has not elapsed in the determining at step S40, the step returns to the determining of step S38.

When it is determined that the stand-by time registered in the station has not elapsed in the determining of step S40, an operation necessary as the central control station is performed. Specifically, periodic transmission of the descending management information is started to carry out the management of information transmission in the network at the station.

In the network system 1 of the embodiment of the present invention as described above, when some inconvenience occurs in the master control station 100 functioning as the central control station, a slave control station functions as a central control station, and stable information transmission can be performed without stopping the operating condition of the network.

In this case, since it is set that a slave control station which becomes a central control station at the time an inconvenience occurs in the master control station specifies a plurality of communication terminals in the network, in a state where at least one among the specified slave control stations normally operates, the operating condition at the time can be maintained without resetting the network, and the possibility that the operating condition of the network can be maintained can be enhanced compared with a case where only one is specified as a slave control station. In this case, since priority order is set in the plurality of slave control stations and the plurality of slave control stations are operated as central control stations after standing by only each different stand-by time set in accordance with the priority order, the plurality of slave control stations do not start to operate as the central control stations at the same time, whereby a situation where a plurality of central control stations exist in one network can be avoided reliably.

In the embodiment described above, although three communication terminals in the network are specified as slave control stations, two or four or more communication terminals may be given priority order to be specified as slave control stations. In this case, when all communication terminals in the network has a network structure in which all communication terminals can be control stations, all the communication terminals may be given priority order to be specified as slave control stations.

In the embodiment described above, when a terminal to be specified as a slave control station is selected, although a determination is made from the number of terminals with which the terminal can communicate or the communication quality, the determination may be made from another factor. For example, even in a structure where a corresponding communication terminal can operate as a slave control station, when it is not preferable for the corresponding communication terminal to be a control station from the structure and/or the operating condition of the corresponding communication terminal, the communication terminal may be ruled out from candidates of the terminals specified as slave control stations.

Specifically, for example, a corresponding communication terminal may be specified as a slave control station only when being operated by supply of commercial AC power, and the terminal may not be specified as a slave control station when an incorporated battery is employed as a power supply so as to restrain the consumption of a battery. Or, one communication terminal in which a battery is set as the power supply among a plurality of specified slave control stations may be specified as one slave control station (however, it is preferred to specify the communication terminal whose priority order is low as a slave control station), so that the operating condition of the network may be maintained even when a service interruption occurs wherein the supply of AC power to some number of communication terminals in the network system is temporarily stopped.

In the embodiment described above, although the stand-by time set based on the priority order is of one second interval time such as 1 second, 2 seconds, 3 seconds, the present invention is not limited to such stand-by time. In a structure in which an inconvenience in a control station can be detected faster, a shorter time may be set as the stand-by time.

Further, slave control stations may be operated in accordance with the order in a process in which differences are provided in the stand-by time other than the process in which slave control stations are operated based on the set priority order.

2) Embodiment 2

Next, a second embodiment of the present invention is described.

FIG. 17 is a chart illustrating stand-by time for each communicating station.

In the drawing, a communication device 214 to be an existing control station shown in FIG. 17D selects communication devices 211, 215, 216 to be control station candidates each shown in FIG. 17A, FIG. 17E, and FIG. 17F, and FIG. 17 illustrates a state where priority order P1, P2, P3 is set among them.

Here, for the sake of convenience, it is specified that the communication device 215 is the control station candidate of priority order P1 representing first priority order, the communication device 211 is the control station candidate of priority order P2 representing second priority order, and the communication device 216 is the control station candidate of priority order P3 representing third priority order, and reconstruction start times T2, T4, T6 each of which is from the time of reconstructing the wireless network to the time of starting operations as control stations are set.

The communication device 215 of the control station candidate of priority order P1 sets 2 units as the reconstruction start time T2 with respect to a predetermined base unit T1, the communication device 211 of the control station candidate of priority order P2 sets 4 units as the reconstruction start time T4 with respect to the predetermined base unit T1, and the communication device 216 of the control station candidate of priority order P3 sets 6 units as the reconstruction start time T6 with respect to the predetermined base unit T1.

By this, in a case where the communication device 214 which is an existing control station disappears from the wireless network, the communication device 215 of priority order P1 of the control station candidate obeys the priority order and performs the operation as a control station prior to other communication devices.

Other communication devices 212, 213, 217 which do not have specified priority order are in a state where specifying of priority order is not performed, and since the communication devices 212, 217 are provided with control functions necessary to operate as control stations, the communication devices 212, 217 are allowed to start operating as control stations simultaneously after a predetermined simultaneous cancel time TR has elapsed.

Since the communication devices 213 is not provided with the control function necessary to operate as a control station, it is set that the communication devices 213 is subordinate to a communication device to be a control station candidate to form the wireless network.

At the predetermined simultaneous cancel time TR, for example, maximumly 15 communication devices other than the control station can be provided, and when considering that T2 is set as a reconstruction start time in each communication device, a reconstruction start time can be set to 30T (=15×2T).

FIG. 18 is a chart illustrating transition states of changes in stand-by time of each communicating station. FIG. 18 illustrates transition states of a case where the priority order for each communication device set in FIG. 17 described above is respectively changed.

The drawing shows a case where priority order P2 representing second priority order of the communication device 211 is changed to priority order P1 representing first priority order, priority order P1 representing first priority order of the communication device 215 is changed to priority order P2 representing second priority order, and no priority order of the communication device 217 is newly set to priority order P4 representing fourth priority order. There is no change in priority order P3 representing third priority order of the communication device 216.

Here, although specifying reconstruction start times is performed in even number units T2, T4, T6 with respect to the base unit T1 according to priority order in FIG. 17 described above, to avoid a state where the existing setting of reconstruction start times T2, T4, T6 are duplicated, in FIG. 19, specifying reconstruction start times is performed in odd number units T1, T3, T5, T7 with respect to the base unit T1 so as not to overlap with those of FIG. 17.

That is, the communication device 211 of the control station candidate of priority order P1 sets 1 unit of the base unit T1 as the reconstruction start time T1, the communication device 215 of the control station candidate of priority order P2 sets 3 units of the base unit T1 as the reconstruction start time T3, the communication device 216 of the control station candidate of priority order P3 sets 5 units for the predetermined base unit T1 as the reconstruction start time T5, and the communication device 217 of the control station candidate of priority order P4 sets 7 units of the base unit T1 as the reconstruction start time T7.

Another communication device 212 which does not have specified priority order is in a state where specifying of priority order is not performed, and since being provided with the control function necessary to operate as a control station, the communication device 212 is allowed to start operating as a control station simultaneously after a predetermined simultaneous cancel time TR has elapsed.

Since the communication devices 213 is not provided with the control function necessary to operate as a control station, it is set that the communication devices 213 is subordinate to a communication device to be a control station candidate to form the wireless network.

FIG. 19 is a chart illustrating confirmation states of changes in stand-by time for each communicating station. FIG. 19 illustrates confirmation states of a case where the priority order for each communication device set in the transition states of FIG. 18 described above are respectively confirmed in order to correspond to changes on next priority order. Therefore, in a case where the priority order is changed over again from confirmation states of FIG. 19, after shift to the transition states of FIG. 18 is once performed, shift to the confirmation states of FIG. 19 is performed once again.

Here, in the confirmation states of FIG. 19, specifying reconstruction start times is performed in even number units T2, T4, T6, T8 with respect to the base unit T1 similarly to that of FIG. 17, although specifying reconstruction start times is performed in odd number units T1, T3, T5, T7 with respect to the base unit T1 according to priority order in the transition states of FIG. 18 described above.

That is, the communication device 211 of the control station candidate of priority order P1 sets 2 unit of the base unit T1 as the reconstruction start time T2, the communication device 215 of the control station candidate of priority order P2 sets 4 units of the base unit T1 as the reconstruction start time T4, the communication device 216 of the control station candidate of priority order P3 sets 6 units for the predetermined base unit T1 as the reconstruction start time T6, and the communication device 217 of the control station candidate of priority order P4 sets 8 units of the base unit T1 as the reconstruction start time T8.

Another communication device 212 which does not have specified priority order is in a state where specifying of priority order is not performed, and since the communication device 212 is provided with the control function necessary to operate as a control station, the communication device 212 is allowed to start operating as a control station simultaneously after a predetermined simultaneous cancel time TR has elapsed.

Since the communication devices 213 is not provided with the control function necessary to operate as a control station, it is set that the communication devices 213 is subordinate to a communication device to be a control station candidate to form the wireless network.

FIG. 20 is a chart illustrating a transmission sequence of control station candidate information.

FIG. 20 illustrates an operation sequence in which the communication device 214 that is an existing control station determines priority order of each communication device for the communication devices 211, 215, 216 to be control station candidates to inform the network of selection result.

First, at step S51, priority order information is transmitted via a broadcast from the communication device 214 that is an existing control station to each communication device on the network. Specifically, the priority order information is priority order P1 to P4 for communication devices of each control station candidate shown in FIG. 17, FIG. 18, FIG. 19 described above, the reconstruction start times T1 to T8 for reconstructing the wireless network, and the like.

At step S52, the communication device 211 to which priority order is given through the priority order information transmitted via the broadcast sends back receipt confirmation information for the priority order information to the communication device 214 that is an existing control station. Specifically, by the sending back of the receipt confirmation information from the communication device 211, it becomes clear that the communication device 211 recognizes the priority order P1 to P4 of the priority order information of the stations in the network and the reconstruction start times T1 to T8.

At step S53, similarly, the communication device 215 to which priority order is given through the priority order information transmitted via the broadcast sends back the receipt confirmation information for the priority order information to the communication device 214 that is an existing control station. Specifically, by the sending back of the receipt confirmation information from the communication device 215, it becomes clear that the communication device 215 recognizes the priority order P1 to P4 of the priority order information of the stations in the network and the reconstruction start times T1 to T8.

At step S54, similarly, the communication device 216 to which priority order is given through the priority order information transmitted via the broadcast sends back the receipt confirmation information for the priority order information to the communication device 214 that is an existing control station. Specifically, by the sending back of the receipt confirmation information from the communication device 216, it becomes clear that the communication device 216 recognizes the priority order P1 to P4 of the priority order information of the stations in the network and the reconstruction start times T1 to T8.

Here, regarding the communication devices 212, 213, 217 which do not have specified priority order, reduction in transmission traffic can be achieved by omitting sending back of the receipt confirmation of the priority order.

FIG. 21 is a view illustrating an example of the structure of a control station candidate specifying packet.

FIG. 21 corresponds to priority order information transmitted via the broadcast from the communication device 214 that is an existing control station to each communication device on the network at step S51 of FIG. 20 described above and is the one showing the structure of the control station candidate specifying packet as a control packet by which an existing control station gives priority order to specify a control station candidate. The control station candidate specifying packet of FIG. 21 is the information transmitted employing an asynchronous transmission region (ASY) 238 shown in FIG. 19.

In the drawing, the control station candidate specifying packet has and is composed of a packet type 241 for specifying a packet, a transmission source communicating station ID 242 specifying an information transmission source communication device, and a reception destination communicating station ID 243 specifying an information reception destination communication device.

When the broadcast transmission is performed, a broadcast specifying code (3Fh) is substituted in the field thereof.

Following those, in the control station candidate specifying packet, stand-by time 244-1 and control station candidate communicating station ID 244-2 are specified as information 244 of priority order P1, stand-by time 245-1 and control station candidate communicating station ID 245-2 are specified as information 245 of priority order P2, and stand-by time 246-1 and control station candidate communicating station ID 246-2 are specified as information 246 of priority order P3. The stand-by times correspond to T1 to T8, and the control station candidate communicating station IDs correspond to the communication devices 211 to 213, 215 to 217.

The control station candidate specifying packet is constructed wherein existing control station specifies only the respective stations of the number of communicating stations provided with control functions which are fit to be control station candidates and a reserve region 247 is added with a CRC (Cyclic Redundancy Check) 248 at the end for a future expansion of a time when specifying priority order P5 or later is performed in remaining region.

Another information may be added or unnecessary information may be curtailed to or from the fields as the need arises.

FIG. 22 is a view illustrating the structure of a priority order confirming packet.

FIG. 22 illustrates the structure of the priority order confirming packet as a control packet of the receipt confirmation sent back from a control station candidate to the existing control station. The priority order confirming packet of FIG. 22 is the information transmitted employing the asynchronous transmission region (ASY) 238 shown in FIG. 19.

In the drawing, the priority order confirming packet has and is composed of a packet type 251 for specifying a packet, a transmission source communicating station ID 252 specifying an information transmission source communication device, and a reception destination communicating station ID 253 specifying an information reception destination communication device.

Following those, the priority order confirming packet sets priority order 254 specified for control station candidates, the stand-by time 255 thereof, and specified communicating station ID 256 of a station specified as a control station candidate, and further, remaining region is structured as a reserve region 257 for further expansion while a CRC 258 is added at the end thereof.

Another information may be added or unnecessary information may be curtailed to or from the fields as the need arises.

Although the embodiments described above are examples in which the present invention is applied to a network in which wireless communication is performed, as far as a network needing a similar central control station is employed, the present invention can also be applied to a network in which a plurality of communication terminals are connected by wired signal lines.

Although the present embodiments described above are examples in which the present invention is applied to the wireless 1394 format, the present invention is not limited to this, and it is needless to say that the present invention can be applied to other wireless networks.

According to the present invention, when the master control station becomes incapable of communication, a plurality of slave control stations try to manage information transmission as control stations in the set order one after another, and the slave control stations managing the information transmission thereafter manage the information transmission among the respective communication terminals. Therefore, since any one of the plurality of slave control stations prepared can manage the information transmission, even when the master control station becomes incapable of communication, the operating condition of the network can be continued. Here, since the order of trying to manage the information transmission is set among the plural slave control stations, the plural slave control stations do not operate simultaneously, whereby control condition is not be disturbed.

Regarding management means of the plural control stations, in the setting of the order by which management of the information transmission is performed at the time the master control station is incapable of communication, by providing the time difference from the time when the master control station becomes incapable of communication to the time managing the information transmission is started, there are time differences to manage based on the set order, and managing only by one of the plural slave control stations can be performed excellently.

Regarding management means of the master control station, by setting the order of specifying the slave control stations based on information transmission condition of the respective communication terminals, for example, a communication terminal most excellent in the information transmission condition can be set as a slave control station of higher order, and a communication terminal having a poorer information transmission condition can be set as a slave control station of lower order, whereby setting of order of slave control stations can be performed in a most preferable state.

At the time of setting the order of specifying the slave control stations based on the information transmission condition of the respective communication terminals as described above, the information transmission condition can be determined from the number of communication terminals capable of direct communication in the network or the communication quality with the respective communication terminals, whereby decision on the information transmission condition can be performed excellently.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication apparatus employing a plurality of communication devices to construct a wireless network to be a control station transmitting management information in the wireless network, the communication apparatus comprising:
   a communication means transmitting information among the plurality of communication devices;
   a determining means determining as to whether, when the control station disappears from the wireless network, in order that any one of other communication devices is newly operated as a control station, the other communication devices have a control function as a control station candidate or not;
   a set means setting priority order for each of control station candidates when there exist a plurality of communication devices to be the control station candidates; and
   a notification means for notifying the wireless network of priority order information of the control station candidates, said priority order information identifying a predetermined ordering of at least a subset of said other communication devices based on at least one of performance and coverage information so as to avoid negotiation between said other communication devices regarding which ultimately operates as a replacement control station,
   wherein the notification means specifies, as the priority order information, stand-by times corresponding to the times until the respective control station candidates start to reconstruct the wireless network, and
   the set means sets the priority order in the order of the number of other communication devices capable of being connected with the control station candidate for the respective control station candidates.

* * * * *